United States Patent [19]

Dalter et al.

[11] 4,430,127

[45] Feb. 7, 1984

[54] EPOXYLATED AMINE ASPHALT ANTI-STRIPPING AGENT

[75] Inventors: Raymond S. Dalter; Dennis W. Gilmore, both of Cincinnati, Ohio

[73] Assignee: Carstab Corporation, Reading, Ohio

[21] Appl. No.: 313,520

[22] Filed: Oct. 21, 1981

[51] Int. Cl.³ .............................................. C08L 95/00
[52] U.S. Cl. ............................... 106/273 N; 106/277; 106/279; 106/281 N; 208/44; 252/311.5
[58] Field of Search ............... 106/273 N, 281 N, 279, 106/277; 208/44; 252/311.5

[56] References Cited

U.S. PATENT DOCUMENTS 3,615,797  10/1971  Ohtsuka ............................. 106/278
3,933,710   1/1976  Fukushi et al. ....................... 524/61

*Primary Examiner*—John Kight, III
*Assistant Examiner*—Amelia B. Yarbrough
*Attorney, Agent, or Firm*—Gerald K. White; Richard J. Sheridan

[57] ABSTRACT

In accordance with this invention there are provided compositions of matter comprising a bitumen containing material and an epoxylated polyamine wherein at least two of the amino nitrogen atoms are separated by six carbon atoms. These compositions provide improved adhesion between aggregate materials and the bitumen containing material.

7 Claims, No Drawings

EPOXYLATED AMINE ASPHALT ANTI-STRIPPING AGENT

BACKGROUND OF THE INVENTION

Unique physical properties and an abundant supply have established asphalt as a major raw material for use in industrial applications that involve structural adhesive and waterproof protective films. The major markets for these industrial applications are road paving and roofing respectively. Although these two markets have final products that are physically quite different, certain basic similarities do exist. For instance, both asphalt cement and mineral filled roofing asphalt can consist of the combination of asphalt with silica or limestone based minerals. Consequently, chemical and physical factors which can influence the asphaltic coating of minerals are operative in both applications.

Residual oils and/or bituminous materials, such as asphalt, used in the preparation of pavements do not coat and adhere well to mineral aggregates unless the aggregate is substantially dry, and, for this reason, in conventional pavements it may be necessary to dry the mineral aggregate prior to blending with the bituminous material.

Mineral aggregates employed in road pavement range in character from hydrophilic to hydrophobic. In general, siliceous and acidic minerals, such as sands and gravels, tend to be hydrophilic while calcareous, alkaline minerals, such as limestone, tend to be more hydrophobic. It has been observed that the mineral aggregates appear to have a greater attraction for water than for oil or bitumens and that it is difficult to obtain complete or satisfactory coating of aggregates by oil or bitumen when water is present. Furthermore, even though satisfactory coating may be obtained by using dry aggregates, the oil or bitumen tends to be displaced if water enters the pavement or road.

One approach which has been used to decrease the severity of the problems attributed to poor adhesion between the aggregate and bitumens and/or stripping of the bitumen from the aggregate due to the presence of moisture has been to include an additive (hereinafter referred to as an antistripping agent) in the bitumen prior to combination with the aggregate. These antistripping agents serve to enhance the coating of the aggregate by bitumens and retard displacement of the aggregate-bitumen bond by water.

The art discloses several antistripping agents which are useful as additives in bitumens and asphalts. For example, U.S. Pat. No. 2,759,839 to Crews et al. discloses antistripping agents having the formula:

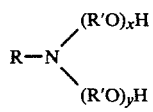

where R is an alkyl group of at least about 8 carbon atoms, R' is an ethylene or propylene radical, and x and y are integers, the sum of which is not greater than about 8.

U.S. Pat. No. 3,615,797 discloses bitumen additives which improve the adhesion properties of the bitumen. These additives have the formula:

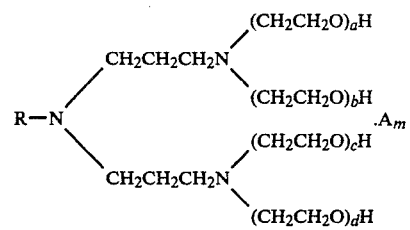

wherein R is an alkyl or alkenyl radical of 8 to 22 carbon atoms; a, b, c and d are integers from 1 to 7 and the sum of $a+b+c+d$ is from 4 to 10; A is an organic or inorganic acid and m is 0 or an integer from 1 to 3, its acid salts and mixtures thereof.

Organic compounds which are structurally similar to those disclosed in U.S. Pat. Nos. 2,759,839 and 3,615,797 but which have utilities other than as antistripping additives for bitumens and asphalts are disclosed in the following patents:

U.S. Pat. No. 2,767,214 to Bersworth discloses polyhydroxy polyalkylene polyamines which are useful as surface active agents, detergents, wetting agents and as intermediates in the production of soap-like amino compounds. The polyhydroxy polyalkylene polyamines have the general structural formula:

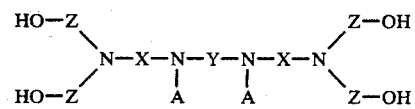

wherein Y is a bivalent alkylene chain containing from 2 to 3 carbon atoms; X is a bivalent alkylene radical of from 4 to 12 carbon atoms which may be interrupted with ether oxygen atoms; Z is a bivalent alkylene radical of from 2 to 6 carbon atoms which may be either branched or straight chained; and A is a member of the group consisting of hydrogen and one of the substituent groups consisting of methyl, ethyl, n-propyl, isopropyl and butyl.

U.S. Pat. No. 2,901,461 to Auerbach et al. discloses hydroxyalkyl alkylene polyamines containing at least one hydroxyalkyl group and at least three amino hydrogen atoms per molecule which are useful as hardeners for polyepoxy compounds and which have the general formula:

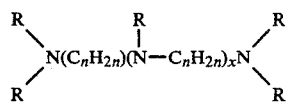

wherein x is an integer from zero to 3, n is an integer from 2 to 6, R in each instance is a monovalent substituent being either hydrogen or a hydroxyalkyl group, and the number of instances per molecule where R represents a hydroxyalkyl group being at least one, but less than $x+2$.

U.S. Pat. No. 3,200,155 discloses compounds having the formula:

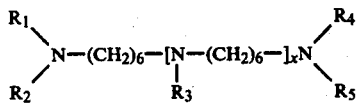

wherein $R_1$, $R_2$, $R_3$, $R_4$ and $R_5$ are selected from the group consisting of hydrogen, $HOCH_2CH_2-$,

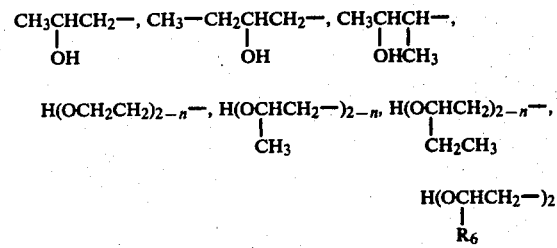

wherein $R_6$ is one of hydrogen, methyl or ethyl in at least one occurrence and another one of hydrogen, methyl and ethyl in the remainder of occurrences, x is a small integer, and at least one of $R_1$, $R_2$, $R_3$, $R_4$ and $R_5$ is one of the aforedefined groups other than hydrogen. The disclosed compounds are useful as chemical intermediates and cross-linking agents.

SUMMARY OF THE INVENTION

It has now been discovered that unexpectedly high adhesion between aggregate and bitumen and improvements in the tensile strength of paving compositions are achieved when epoxylated polyamines wherein at least two of the amino nitrogen atoms are separated by six carbon atoms are added to the bitumen or asphalt as anti-stripping agents.

Thus, in accordance with this invention there are provided compositions of matter comprising a bitumen containing material and an epoxylated polyamine wherein at least two of the amino nitrogen atoms are separated by six carbon atoms. These compositions are useful in paving compositions wherein said compositions are blended with and coat the surface of an aggregate material, thereby providing improved adhesion between the aggregate material and bitumen containing material and improving the strength of the paving composition.

In accordance with this invention there are also provided compositions comprising an aggregate material blended with and coated by a composition comprising a bitumen containing material and an epoxylated polyamine wherein at least two of the amino nitrogen atoms are separated by six carbon atoms.

This invention further provides a substrate coated with a composition comprising an aggregate material blended with and coated by a composition comprising a bitumen containing material and an epoxylated polyamine wherein at least two of the amino nitrogen atoms are separated by six carbon atoms.

DESCRIPTION OF THE PREFERRED EMBODIMENTS

The compounds useful as asphalt anti-stripping agents in the practice of this invention comprise epoxylated polyamines wherein at least two of the amino nitrogen atoms are separated by six carbon atoms. More particularly, the epoxylated polyamines useful in this invention are the reaction products of polyamines having the general formulas (I)-(III):

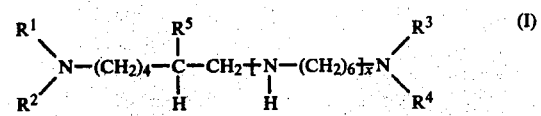

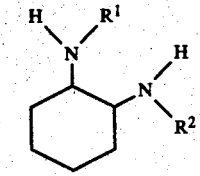

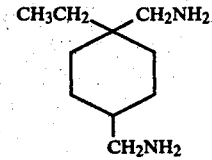

wherein $R^1$, $R^2$, $R^3$, $R^4$ and $R^5$ each are $-H$ or $-CH_2CH_2CH_2NH_2$ and x=0 or 1, or mixtures of such polyamines; and epoxy compounds having the general formula:

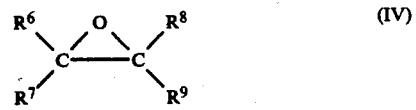

wherein $R^6$, $R^7$, $R^8$ and $R^9$ are each H, alkyl, alkenyl, aryl, alkaryl or aralkyl.

As used herein, the term alkyl means a monovalent, saturated hydrocarbon group containing 1 to 18 carbon atoms. Preferred alkyl groups are methyl, ethyl and propyl. The term alkenyl refers to monovalent $C_2$ to $C_{18}$ hydrocarbon groups containing at least one carbon-carbon double bond. The term aryl refers to monovalent $C_6$ to $C_{10}$ aromatic rings. The preferred aryl group is phenyl. The term alkaryl refers to monovalent aryl radicals having attached thereto at least one alkyl group. The term aralkyl refers to monovalent alkyl radicals having attached thereto at least one aryl group.

The polyamines which may be used to prepare the epoxylated polyamines useful in the practice of this invention may further be characterized as polyamines having a Base Value of about 400 to about 965 and a Primary Amine No. of about 150 to about 965. Base Value and Primary Amine No. are calculated as follows:

$$\text{Base Value} = \frac{(56.1) \text{ (meq. HCl)}}{\text{weight of sample in grams}}$$

$$\text{Primary Amine No.} = \frac{(56.1) \text{ (meq. sodium methylate)}}{\text{weight of sample in grams}}$$

In the above formulas, 56.1 represents the molecular weight of potassium hydroxide and is a common factor used in the industry to relate Base Values, Acid Values and Primary Amine Numbers to the common units of mg KOH/gram of sample. In the Base Value formula, meq-HCl denotes the amont of HCl required to titrate a solution of the sample to a bromphenol blue endpoint. In the determination of Primary Amine No., the sample is first reacted with 2,4-pentanedione and then titrated with a sodium methylate solution.

The preferred polyamines which may be used to prepare the epoxylated polyamine anti-stripping agents useful in this invention are hexamethylenediamine and bis hexamethylenetriamine (BHMT). A particularly preferred polyamine is a by-product from the commercial production of hexamethylenediamine. Hexamethylenediamine is produced commercially by one of two general processes, those processes are represented schematically as follows:

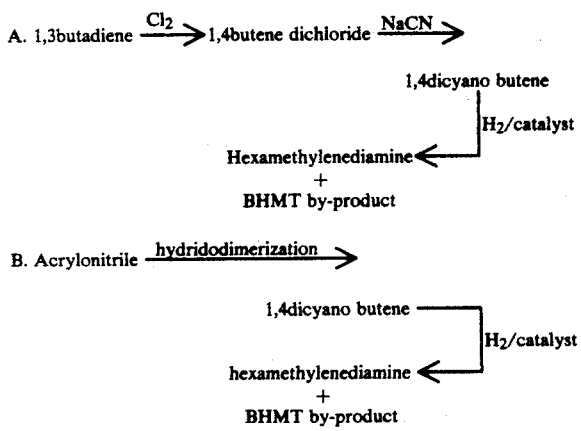

The BHMT by-product is recovered as the bottoms from the distillation of the hydrogenation product in each process. The BHMT by-product, also referred to herein as crude BHMT, typically contains the following components and has the typical Primay Amine Numbers and Base Values indicated below:

| Component | Process A By-product | Process B By-product |
|---|---|---|
| Hexamethylenediamine | 0.1–3%* | 0.5–14% |
| $NH_2-(CH_2)_5-C\equiv N$ | 4–20% | 0.01–5.0% |
| (cyclohexane with $CH_2NH_2$ and $NH_2-CH_2$, $CH_2CH_3$) | 8.5–38% | 1.5–3.5% |
| Adiponitrile | 2.5–15% | (0) |
| BHMT | 12–45% | 41–85% |
| $H_2N-(CH_2)_5-\overset{O}{\overset{\|}{C}}NH_2$ | 1–6.5% | — |
| Primary Amine No. | 180–387 | 336–458 |
| Base Value | 406–603 | 589–788 |

*All percentages are by weight based on the weight of the by-product.

The preferred epoxy compounds which may be used to prepare the epoxylated polyamines useful in this invention are ethylene oxide, propylene oxide and 1-butene oxide.

The epoxylated polyamines useful in the practice of this invention may be prepared by techniques well known in the art, such as that described in U.S. Pat. No. 3,200,155 which is hereby incorporated by reference into this specification. In general, however, the initial step in the preparation of the epoxylated polyamines involves the condensation of the polyamine with the epoxy compound. In most cases the reaction will proceed by simply combining the polyamine and epoxy compound at ambient conditions in an appropriate apparatus. An exotherm is generated as a result of the condensation reaction and, for this reason, the more volatile epoxy compounds, such as ethylene oxide and propylene oxide, are best reacted either with a very cold condensing unit present or in a closed container such as an autoclave. Also, in some cases external heat may be applied to the reactants in order to increase their reaction rate.

The chemical structures generated by the above described condensation reaction contain hydroxyethylene or substituted hydroxyethylene groups (depending upon the particular epoxy compound employed) attached to at least one of the amino nitrogen atoms in the polyamine, thereby creating compounds having amino nitrogen atoms and hydroxy groups on adjacent carbon atoms.

Since the polyamines used to prepare the epoxylated polyamines are polyfunctional, i.e. have more than one amino group, the structure of epoxylated product will reflect the relative reactivity of the amino groups in the polyamine. Thus, the condensation of the epoxy compound will initially occur principally with the primary amine groups. After all of the primary amine groups in the polyamine contain one hydroxyethylene or substituted hydroxyethylene group attached thereto, condensation will take place with the secondary amine groups present in the partially epoxylated polyamine, most likely in a random fashion. This serves to create an isomeric mixture of products. The condensation reaction will not occur with tertiary amine groups. Thus, the polyamine is completely epoxylated, and the condensation reaction ceases, when all of the non-tertiary amine groups in the original polyamine are epoxylated to tertiary amine groups. Of course, by adjusting the molar ratio of epoxy compound to non-tertiary amino groups in the polyamine, epoxylated polyamines can be produced which contain varying degrees of epoxylation.

The epoxylated polyamines useful in the practice of this invention may be represented by the following formula:

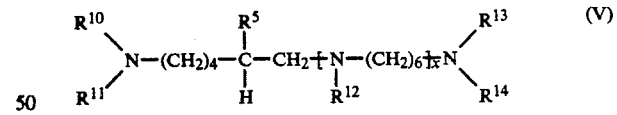 (V)

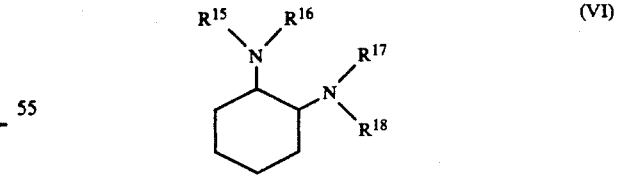 (VI)

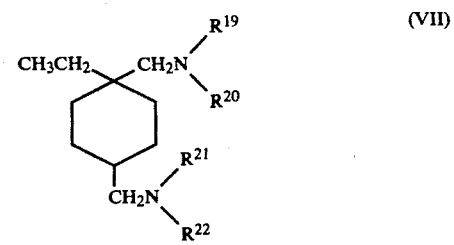 (VII)

wherein

R⁵ and x are as previously defined in formula (I);
R¹⁰, R¹¹, R¹², R¹³, R¹⁴, R¹⁵ and R¹⁷ are each —H,

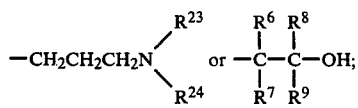

R¹⁶, R¹⁸, R¹⁹, R²⁰, R²¹, R²², R²³ and R²⁴ are each —H or

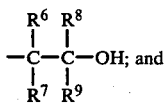

R⁶, R⁷, R⁸ and R⁹ are as previously defined in formula (IV);

with the proviso that at least one of R¹⁰, R¹¹, R¹², R¹³, R¹⁴, R¹⁵, R¹⁶, R¹⁷, R¹⁸, R¹⁹, R²⁰, R²¹, R²², R²³ and R²⁴

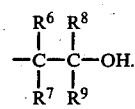

It has been found that the effectiveness of the epoxylated polyamines as asphalt anti-stripping agents is dependant upon the extent to which the polyamines are epoxylated. The amount of epoxy compounds employed to prepare the epoxylated polyamines may be expressed in terms of the mole ratio of epoxy compound to titratable amine nitrogen in the polyamine. In general, effective anti-stripping agents are prepared when the mole ratio of epoxy compound to titratable amine nitrogen in the polyamine is from about 0.1:1.0 to about 5.0:1.0. Preferably, this mole ratio is about 0.3:1.0 to about 1.3:1. The extent of epoxylation may also be expressed as the weight percent of hydroxyethylene or substituted hydroxyethylene groups in the epoxylated polyamine, said weight percent being based on the total molecular weight of the epoxylated polyamine. Obviously, this weight percent will vary depending upon the particular polyamine and epoxy compounds employed to prepare a particular epoxylated polyamine. However, it does provide a useful means for comparing the extent of epoxylation in two or more epoxylated polyamines prepared using the same polyamines and epoxy compounds as starting materials. For the sake of simplicity, all such weight percents will be expressed herein in terms of the original epoxy compound, e.g. 30% ethylene oxide.

The amount of epoxylated polyamine employed in the bituminous material will vary depending upon several factors, including the particular polyamine and epoxide used to prepare the epoxylated polyamine, the degree of epoxylation in the epoxylated polyamine and the particular bituminous material. It is required only that an amount of epoxylated polyamine be employed which will impart anti-stripping properties to the bituminous material. In general, the epoxylated polyamines are employed in amounts of at least about 0.05% by weight based on the weight of the bituminous material. While there is no critical upper limit to the amount of epoxylated polyamine which may be utilized, generally amounts in excess of about 1.0% by weight based on the weight of the bituminous material do not yield increases in anti-stripping properties commensurate with the increased amount of epoxylated polyamines.

The following examples further illustrate the invention, and it will be understood that the invention is not limited thereto. In the examples, and throughout this specification, all parts and percentages are by weight unless otherwise specified.

EXAMPLE 1

This example illustrates the preparation of an epoxylated polyamine from ethylene oxide and crude BHMT resulting in a product containing 30% by weight ethylene oxide.

A 3-neck, 0.5 liter round bottom flask equipped with a heating mantle, overhead stirrer, dry ice/acetone condenser and gas inlet sparge tube is charged with 243 g. of crude BHMT (Base Value=692, Primary Amine No.=419, 70% by weight BHMT). The flask is heated until the amine melts (35°–45° C.) and maintained at the lowest temperature which will allow stirring. Over a one hour period ethylene oxide (105 g.) is bubbled into the amine solution from a compressed cylinder through the sparge tube. The reaction is allowed to continue for one hour after the ethylene oxide addition is completed. The temperature of the reaction mixture is elevated to 80°–100° C. and the reaction flask is evacuated (15–30 mm Hg) for thirty minutes and then allowed to cool to ambient temperature. The resulting product is a liquid produced in a typical yield of about 345 g. which is 99% of the theoretical yield. The product has a Base Value=486, Primary Amine No.=107 and is 30% by weight ethylene oxide.

EXAMPLE 2

This example illustrates the preparation of an epoxylated polyamine from ethylene oxide and crude BHMT resulting in a product containing 5% by weight ethylene oxide.

The procedure of Example 1 is repeated using 350 g. of the crude BHMT and 18.5 g. of ethylene oxide. The resulting product is a solid having a Base Value=654, Primary Amine No.=351 and is 5% by weight ethylene oxide.

EXAMPLE 3

This example illustrates the preparation of an epoxylated polyamine from crude BHMT and ethylene oxide resulting in a product containing 20% by weight ethylene oxide.

The procedure of Example 1 is repeated using 210 g. of the crude BHMT and 53 g. of ethylene oxide. The resulting product is a liquid having a Base Value=560, Primary Amine No.=154 and is 20% by weight ethylene oxide.

EXAMPLE 4

This example illustrates the preparation of an epoxylated polyamine from crude BHMT and ethylene oxide resulting in a product containing 10% by weight ethylene oxide.

The procedure of Example 1 is repeated using 280 g. of the crude BHMT and 31 g. of ethylene oxide. The resulting product is a liquid having a Base Value=626, Primary Amine No.=270 and is 10% by weight ethylene oxide.

EXAMPLE 5

This example illustrates the preparation of an epoxylated polyamine from crude BHMT and ethylene oxide resulting in a product containing 40% by weight ethylene oxide.

The procedure of Example 1 is repeated using 196 g. of the crude BHMT and 137 g. of ethylene oxide. The resulting product is a liquid having a Base Value=422, Primary Amine No.=54 and is 40% by weight ethylene oxide.

EXAMPLE 6

This example illustrates the preparation of an epoxylated polyamine from crude BHMT and ethylene oxide resulting in a product containing 50% by weight ethylene oxide.

The procedure of Example 1 is repeated using 145 g. of the crude BHMT and 159 g. of ethylene oxide. The resulting product is a liquid having a Base Value=336, Primary Amine No.=21 and is 50% by weight ethylene oxide.

EXAMPLE 7

This example illustrates the preparation of an epoxylated polyamine from a crude BHMT and ethylene oxide resulting in a product containing 30% by weight ethylene oxide.

The procedure of Example 1 is repeated using 215 g. of a crude BHMT having a Base Value=475, Primary Amine No.=299 and containing 23% by weight BHMT, and 92 g. of ethylene oxide. The resulting product is a viscous liquid and is produced in a typical yield of 303 g. (98.5%). The product has a Base Value=335, Primary Amine No.=43 and is 30% by weight ethylene oxide.

EXAMPLE 8

This example illustrates the preparation of an epoxylated polyamine from the crude BHMT employed in Example 7 and ethylene oxide resulting in a product containing 20% by weight ethylene oxide.

The procedure of Example 1 is repeated using 300 g. of the crude BHMT employed in Example 7 and 75 g. of ethylene oxide. The resulting product is a liquid having a Base Value=380, Primary Amine No.=93 and is 20% by weight ethylene oxide.

EXAMPLE 9

This example illustrated the preparation of an epoxylated polyamine from the crude BHMT of Example 7 and ethylene oxide resulting in a product containing 40% by weight ethylene oxide.

The procedure of Example 1 is repeated using 220 g. of the crude BHMT employed in Example 8 and 147 g. of ethylene oxide. The resulting product is a viscous liquid having a Base Value=297, Primary Amine No.=11 and is 40% by weight ethylene oxide.

EXAMPLE 10

This example illustrates the preparation of an epoxylated polyamine from a crude BHMT and propylene oxide resulting in a product containing 30% by weight propylene oxide.

A 3-neck, 0.5 liter round bottom flask equipped with heating mantle, overhead stirrer, dry ice/acetone condenser and a 125 ml pressure equalizing addition funnel is charged with 264 g. of crude BHMT (Base Value=685, Primary Amine No. 384, 64% by weight BHMT). The flask is heated until the amine melts and then maintained at the lowest temperature which will allow stirring. Chilled (0° C.) propylene oxide (115 g.) is placed into the additional funnel and then added dropwise over a period of one hour to the flask. The resulting reaction mixture is stirred for an additional hour after which the temperature of the reaction mixture is increased and the flask evacuated as in Example 1. The resulting product is a liquid and is obtained in a typical yield of 375 g. which is 99% of the theoretical yeild. The product has a Base Value=489, Primary Amine No.=116, and is 30% by weight propylene oxide.

EXAMPLE 11

This example illustrates the preparation of an epoxylated polyamine from the crude BHMT employed in Example 10 and propylene oxide resulting in a product containing 10% by weight propylene oxide.

The procedure of Example 10 is repeated using 292 g. of the crude BHMT employed in Example 10 and 35 g. of propylene oxide. The resulting product is a liquid having a Base Value=623, Primary Amine No.=258 and is 10% by weight propylene oxide.

EXAMPLE 12

This example illustrates the preparation of an epoxylated polyamine from the crude BHMT employed in Example 10 and propylene oxide resulting in a product containing 20% by weight propylene oxide.

The procedure of Example 10 is repeated using 240 g. of the crude BHMT employed in Example 10 and 63 g. of propylene oxide. The resulting product is a liquid having a Base Value=551, Primary Amine No. 167 and is 20% by weight propylene oxide.

EXAMPLE 13

This example illustrates the preparation of an epoxylated polyamine from the crude BHMT employed in Example 10 and propylene oxide resulting in a product containing 40% by weight propylene oxide.

The procedure of Example 10 is repeated using 197 g. of the crude BHMT employed in Example 10 and 135 g. of propylene oxide. The resulting product is a liquid having a Base Value=425, Primary Amine No. 46 and is 40% by weight propylene oxide.

EXAMPLE 14

This example illustrates the preparation of an epoxylated polyamine from the crude BHMT employed in Example 10 and propylene oxide resulting in a product containing 50% by weight propylene oxide.

The procedure of Example 10 is repeated using 163 g. of the crude BHMT employed in Example 10 and 171 g. of propylene oxide. The resulting product is a liquid having a Base Value=336, Primary Amine No. 15 and is 50% by weight propylene oxide.

EXAMPLE 15

This example illustrates the preparation of an epoxylated polyamine from the crude BHMT employed in Example 10 and isobutylene oxide resulting in a product containing 10% by weight isobutylene oxide.

The procedure of Example 10 is repeated using 115 g. of the crude BHMT employed in Example 10 and 13 g. of isobutylene oxide. The resulting product is a liquid having a Base Value of 619, Primary Amine No. 283 and is 10% by weight isobutylene oxide.

EXAMPLE 16

This example illustrates the preparation of an epoxylated polyamine from the crude BHMT employed in Example 10 and isobutylene oxide resulting in a product containing 20% by weight isobutylene oxide.

The procedure of Example 10 is repeated using 103 g. of the crude BHMT employed in Example 10 and 46 g. of isobutylene oxide. The resulting product is a liquid having a Base Value=473, Primary Amine No. 183 and is 20% by weight isobutylene oxide.

EXAMPLE 17

This example illustrates the preparation of an epoxylated polyamine from the crude BHMT employed in Example 10 and styrene oxide resulting in a product containing 10% styrene oxide.

The procedure of Example 10 is repeated using 149 g. of the crude BHMT employed in Example 10 and 17.5 g. of styrene oxide. The resulting product is a liquid having a Base Value=617, Primary Amine No. 291 and is 10% by weight styrene oxide.

EXAMPLE 18

This example illustrates the preparation of an epoxylated polyamine from the crude BHMT employed in Example 10 and styrene oxide resulting in a product containing 30% by weight styrene oxide.

The procedure of Example 10 is repeated using 136 g. of the crude BHMT employed in Example 10 and 60 g. of styrene oxide. The resulting product is a liquid having a Base Value=469, Primary Amine No. 159 and is 30% by weight styrene oxide.

EXAMPLE 19

This example illustrates the preparation of an epoxylated polyamine from the crude BHMT employed in Example 10 and 1-dodecene oxide resulting in a product containing 10% by weight 1-dodecene oxide.

The procedure of Example 10 is repeated using 212 g. of the crude BHMT employed in Example 10 and 25 g. of 1-dodecene oxide. The resulting product is a liquid having a Base Value=622, Primary Amine No. 321 and is 10% by weight 1-dodecene oxide.

EXAMPLE 20

This example illustrates the preparation of an epoxylated polyamine from the crude BHMT employed in Example 10 and 1-dodecene oxide resulting in a product containing 30% by weight 1-dodecene oxide.

The procedure of Example 10 is repeated using 187 g. of the crude BHMT employed in Example 10 and 82 g. of 1-dodecene oxide. The resulting product is a liquid having a Base Value=472, Primary Amine No. 197 and is 30% by weight 1-dodecene oxide.

EXAMPLE 21

This example illustrates the preparation of an epoxylated polyamine from pure BHMT and ethylene oxide resulting in a product containing 20% by weight ethylene oxide.

The procedure of Example 1 is repeated using 100 g. of pure BHMT and 25 g. of ethylene oxide. The resulting product is a liquid having a Base Value=631 Primary Amine No. 213 and is 20% by weight ethylene oxide.

COMPARATIVE EXAMPLE A

The example illustrates, for comparative purposes, the preparation of an epoxylated polyamine from diethylene triamine and ethylene oxide resulting in a product containing 20% by weight ethylene oxide.

The procedure of Example 1 is repeated using 100 g. of diethylene triamine and 25 g. of ethylene oxide. The resulting product is a liquid having a Base Value=1,295 and is 20% by weight ethylene oxide.

COMPARATIVE EXAMPLE B

This example illustrates, for comparative purposes, the preparation of an epoxylated polyamine from triethylene tetraamine and ethylene oxide resulting in a product containing 20% by weight ethylene oxide.

The procedure of Example 1 is repeated using 100 g. of triethylene tetraamine and 25 g. of ethylene oxide. The resulting product is a liquid having a Base Value=1,225, and is 20% by weight ethylene oxide.

EXAMPLE 22

This example illustrates the effectiveness of the epoxylated polyamines as anti-stripping agents for asphalts.

The epoxylated polyamines prepared in Examples 1-21, Comparative Examples A and B and a known, commercial anti-stripping agent, N,N-dimethylaminopropylolelylamide, are each evaluated according to a slight modification of test method ASTM 1664. Each anti-stripping agent is combined in turn with AC-20 asphalt in varying amounts from about 0.05% to 0.50% by weight based on the weight of the asphalt. The asphalt is then mixed with a reference granite aggregate to form a blend containing 8% by weight asphalt and 92% by weight aggregate. The blend is then placed into boiling water and boiling is maintained for 10 minutes. After this time the sample is removed from the water and allowed to air dry. The samples are considered to have passed the foregoing test if at least 95% of the aggregate surface in the dried sample is coated with asphalt.

The various anti-stripping agents are rated in terms of their effectiveness by determining the minimum amount of anti-stripping agent which must be present in the asphalt in order to pass the above test. The results of this rating are shown in Table I below wherein the anti-stripping agents are identified by the number of the example illustrating their preparation, and are listed in order of decreasing effectiveness.

| Anti-Stripping Agent | Weight Percent Requirement[1] |
|---|---|
| Example 6 | 0.07 |
| Example 5 | 0.08 |
| Example 9 | 0.09 |
| Example 1 | 0.10 |
| Example 7 | 0.12 |
| Example 21 | 0.15 |
| Example 14 | 0.15 |
| Example 3 | 0.17 |
| Example 13 | 0.17 |
| Example 10 | 0.20 |
| Example 8 | 0.21 |
| Example 16 | 0.25 |
| Comparative Example B | 0.25 |
| Example 4 | 0.29 |
| Example 12 | 0.29 |
| Comparative Example A | 0.33 |
| Example 18 | 0.35 |
| Example 11 | 0.36 |

| Anti-Stripping Agent | Weight Percent Requirement[1] |
| --- | --- |
| Example 20 | 0.39 |
| Example 15 | 0.39 |
| Example 17 | 0.44 |
| Example 2 | 0.45 |
| Example 19 | 0.46 |
| N,N—dimethylaminopropyloleylamide | 0.50 |

[1]weight percent of anti-stripping agent required to be added to AC-20 asphalt for test passage. Figures are accurate ±10%, i.e. for Example 6 the Weight Percent Requirement is 0.07 ± 10% of 0.63–0.077.

The above results clearly indicate the superiority of the epoxylated polyamines useful in the practice of this invention over the current commercial anti-stripping agent, N,N-dimethylaminopropyloleylamide. Also, the epoxylated polyamines of this invention demonstrate clear superiority over the prior art anti-stripping agents of Comparitive Examples A and B.

EXAMPLE 23

This example illustrates the improvement in compressive strength measurements on bituminous concrete specimens provided by the use of epoxylated polyamines versus polyamines.

Samples are prepared and tested according to ASTM D-1559 and the State of Georgia's test procedure GHD-66 using the anti-stripping additives indicated in Table I below. The test results are summarized in Table I.

TABLE I

| Test | Control no additive | Crude BHMT of Ex. 1, 0.25[1] | Crude BHMT of Ex. 7, 0.50[1] | Ethoxylated Amine of Ex. 1, 0.075[1] | Ethoxylated Amine of Ex. 7, 0.15[1] |
| --- | --- | --- | --- | --- | --- |
| ASTM D-1559 | | | | | |
| Marshall stability at | | | | | |
| 140° F., expressed in pounds | | | | | |
| No conditioning | 2,620 | 2,730 | 2,960 | 2,680 | 3,160 |
| 24 hrs in water at 140° F. | 1,570 | 2,500 | 2,700 | 2,780 | 2,900 |
| Marshall Strength Index | 59.9 | 91.6 | 91.2 | 103.7 | 91.8 |
| GHD-66 | | | | | |
| Diametral Tensile | | | | | |
| Splitting Strength, expressed | | | | | |
| in psi | | | | | |
| No conditioning | 133.0 | 131.2 | 129.6 | 161.5 | 163.1 |
| Conditioned | 20.2 | 108.4 | 110.4 | 127.8 | 155.0 |
| Tensile Strength Ratio | 15.2 | 82.6 | 85.2 | 79.1 | 95.0 |

[1]Weight percent of additive used based on the weight of the asphalt.

What we claim and desire to protect by Letters Patent:

1. A composition comprising a bituminous material and, in an amount effective to impart anti-stripping properties to said bituminous material, an epoxylated polyamine anti-stripping agent comprising a compound or mixture of compounds having the formula:

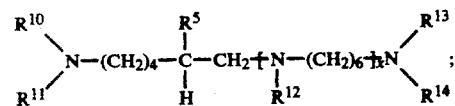

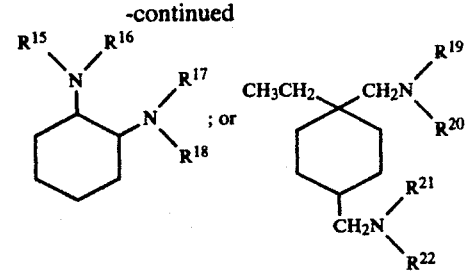

wherein
$R^5$ is —H or —CH$_2$CH$_2$CH$_2$NH$_2$;
$x = 0$ or 1;
$R^{10}$, $R^{11}$, $R^{12}$, $R^{13}$, $R^{14}$, $R^{15}$ and $R^{17}$ are each —H,

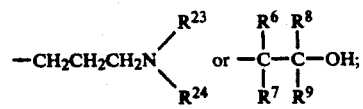

$R^{16}$, $R^{18}$, $R^{19}$, $R^{20}$, $R^{21}$, $R^{22}$, $R^{23}$ and $R^{24}$ are each —H or

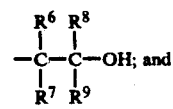

$R^6$, $R^7$, $R^8$ and $R^9$ are each —H, alkyl, alkenyl, aryl, alkaryl or aralkyl;

with the proviso that at least one of $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$ and $R^{24}$

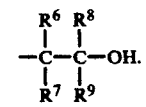

2. The composition of claim 1 wherein the bituminous material is asphalt.
3. The composition of claim 1 wherein $R^6$, $R^7$, $R^8$ and $R^9$ each —H.
4. The composition of claim 1 wherein the epoxylated polyamine has the formula:

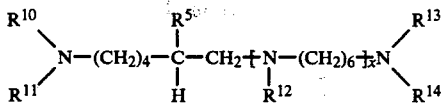

wherein
x=1;
$R^5$ is —H;
$R^{10}$, $R^{11}$, $R^{12}$, $R^{13}$ and $R^{14}$ are each —H or

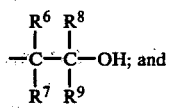

$R^6$, $R^7$, $R^8$ and $R^9$ are each —H.

with the proviso that at least one of $R^{10}$, $R^{11}$, $R^{12}$, $R^{13}$ and $R^{14}$ is

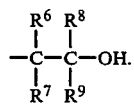

5. The composition of claim 1 wherein the amount of epoxylated polyamine anti-stripping agent employed is at least about 0.05% by weight based on the weight of the bituminous material.

6. A coated product comprising an aggregate material blended with and coated by the composition of claim 1.

7. A substrate coated with the coated product of claim 6.

* * * * *